(12) United States Patent
Cui et al.

(10) Patent No.: US 8,067,128 B2
(45) Date of Patent: Nov. 29, 2011

(54) SEALING STRUCTURE OF FUEL CELL AND METHOD FOR MANUFACTURING THE SAME

(75) Inventors: Tianyu Cui, Shanghai (CN); Zhijun Gu, Shanghai (CN)

(73) Assignee: Horizon Fuel Cell Technologies, Pte., Ltd., Singapore (SG)

( * ) Notice: Subject to any disclaimer, the term of this patent is extended or adjusted under 35 U.S.C. 154(b) by 490 days.

(21) Appl. No.: 12/375,037

(22) PCT Filed: Aug. 3, 2007

(86) PCT No.: PCT/CN2007/002343
§ 371 (c)(1),
(2), (4) Date: Jan. 26, 2009

(87) PCT Pub. No.: WO2008/017251
PCT Pub. Date: Feb. 14, 2008

(65) Prior Publication Data
US 2009/0317693 A1    Dec. 24, 2009

(51) Int. Cl.
*H01M 2/20* (2006.01)
(52) U.S. Cl. ......................................... 429/469; 429/483
(58) Field of Classification Search .................. 429/469, 429/480, 483, 508, 510, 517, 519, 535
See application file for complete search history.

(56) References Cited

U.S. PATENT DOCUMENTS

| | | | | |
|---|---|---|---|---|
| 6,620,210 B2 * | 9/2003 | Murphy et al. | ................. | 8/149.1 |
| 6,660,422 B2 | 12/2003 | Krasij et al. | | |
| 7,157,176 B2 * | 1/2007 | Tanuma | ........................ | 429/483 |
| 7,294,426 B2 * | 11/2007 | Yang | .............................. | 429/465 |
| 7,320,839 B2 * | 1/2008 | Tsuji et al. | ..................... | 429/456 |
| 7,413,826 B2 * | 8/2008 | Ueda et al. | ..................... | 429/479 |
| 7,521,144 B2 * | 4/2009 | Shimohira et al. | ............ | 429/480 |
| 7,807,317 B2 * | 10/2010 | Ueda et al. | ..................... | 429/514 |

* cited by examiner

*Primary Examiner* — Thanh Tam Le
(74) *Attorney, Agent, or Firm* — Woods Rogers PLC; Peter E. Rosden

(57) ABSTRACT

A sealing structure for a fuel cell and a method for manufacturing the same, in this structure, a first gas separator, a first gas diffusion layer and a first catalyst on the one side, a proton exchange membrane, a second catalyst, a second gas diffusion layer and a second gas separator on the other side, are in turn stacked, wherein an area of the second gas diffusion layer is smaller than an area of the proton exchange membrane. The area of the proton exchange membrane is not larger than an area of the first gas diffusion layer, and the area of the first gas diffusion layer is smaller than an area of the first gas separator, therefore, the shape of the front edges of these elements are step-shaped. The area obverse to the step shape is filled with cured sealing material.

16 Claims, 2 Drawing Sheets

SEALING STRUCTURE OF FUEL CELL AND METHOD FOR MANUFACTURING THE SAME

TECHNICAL FIELD

The present invention relates to the field of fuel cells, and in particular, relates to a sealing structure of a fuel cell and to a method for manufacturing the same.

BACKGROUND OF THE INVENTION

A fuel cell uses hydrogen or hydrogen-rich gas as a fuel and oxygen as an oxidant. The major by-product of the chemical reaction taking place in a fuel cell is water, and generally no other harmful substance is emitted. The energy conversion efficiency of a fuel cell is far higher than that of an internal-combustion engine. Thus, a fuel cell is a safe, reliable, clean, environment-friendly and energy-saving power generator. As the fuel cell technology has been well established, fuel cells have been used in equipments as large as submarines and automobiles, and as small as portable computers and mobile phones.

The cathode of a fuel cell is generally exposed to ambient atmosphere directly or indirectly, so as to catch oxygen as its oxidant. Thus, the cathode of a fuel cell does not need to be sealed, or at least not strictly sealed. On the other hand, the anode gas chamber of a fuel cell has to be sealed since a combustible gas of a certain pressure flows through the chamber.

Chinese patent application No. 99808103.5, assigned to U.S. Manhattan Scientifics Inc., which corresponds to U.S. Pat. No. 6,783,883 and is titled "Gas-Proof Assembly Composed of a Bipolar Plate and a Membrane-Electrode Unit of Polymer Electrolyte Membrane Fuel Cells", discloses a component composed of a fuel cell bipolar plate used as a structural unit of a fuel cell stack and a membrane electrode unit, wherein the membrane electrode unit comprises a polymer electrolyte membrane above which, except for its periphery, there is a gas diffusing layer in the component, and the bipolar plate lies on one side of the gas diffusing layer opposite the membrane, extending beyond the periphery of the gas diffusing layer, so as to form a side annular volume area defined by the bipolar plate, the gas diffusing layer and the membrane from above, the inner side and the lower side, respectively, characterized by a seamless and hermetical filling of a cured adhesive in the annular volume area up to its boundary surface. FIG. 4 is a schematic view of the component before it is assembled, illustrating the bipolar plate, the adhesive, the gas diffusing layer and the electrolyte membrane.

With simplicity in structure and process as its merits, the above mentioned technical solution suffers from some drawbacks. In practice, there sometimes exist little holes in the adhesive-filling area adjacent to the electrolyte membrane and the gas diffusing layer. When such a fuel cell has been left unused for a long time, the holes will be filled with air. Once the fuel cell is put into use again, the fuel fed into the chamber will react with the air quickly in the presence of the catalyst on the electrolyte membrane surface, producing a relatively high temperature and thus leading to breakthrough and gas-leak of the electrolyte membrane due to burning. Additionally, the adhesive-filled area often needs to be widened in order to enhance the reliability of sealing, so that the electrolyte membrane is wasted inevitably. It is known that the electrolyte membrane and the catalyst adhered therewith are expensive.

SUMMARY OF THE INVENTION

For the purpose of overcoming the drawbacks described in the background that the electrolyte membrane sometimes will be burnt through and thus result in the leakage of gas, and waste will be aggravated when enhancing the reliability of sealing, the following technical solution is provided according to the present invention:

The present invention provides a sealing structure of fuel cell comprising: a proton exchange membrane, a first gas separator plate, a first gas diffusion layer and a first catalyst on the one side of the proton exchange membrane, and a second catalyst, a second gas diffusion layer and a second gas separator on the other side of the membrane, wherein the first gas diffusion layer and the first catalyst on the one side of the proton exchange membrane, and the second catalyst, the second gas diffusion layer and the second gas separator on the other side of the membrane are stacked in sequence on the first gas separator on the one side, and wherein further the area and shape of the second gas diffusion layer on the other side are smaller than that of the proton exchange membrane, the area and shape of the proton exchange membrane is not larger than that of the first gas diffusion layer on the one side, and the area and shape of the first gas diffusion layer on the one side is smaller than that of the first gas separator plate on the one side, so that the structure takes a step shape obversely corresponding in volume or area to the step shape, being the reverse thereof, the volume of which forms a sealing area which is substantially filled with cured sealing material to form an hermetic seal.

In an optimized case, the first gas diffusion layer on the one side and the proton exchange membrane are of the same area and shape.

The fuel cell may further comprise at least one sealing gasket. At least one through-hole is disposed in each layer from the gas separator on the one side to the gas separator on the other side, the through-holes being connected with each other after the centers of the holes are aligned during assembling. The diameters of the through-holes of the gas diffusion layer on the other side and the gas separator on the other side are not smaller than the outer diameter of the sealing gaskets, while the diameters of the through-holes of the other layers are smaller than the outer diameter of the sealing gaskets. The sealing gaskets are disposed hermetically in the through-holes of the gas diffusion layer on the other side and the gas separator on the other side, but they do not enter the through-holes of the other layers.

In the fuel cell, the first catalyst on the one side may adhere to the surface of the first gas diffusing layer, being opposite to the proton exchange membrane, or adhere to the surface of the proton exchange membrane being opposite the first gas diffusing layer; and the second catalyst on the other side may adhere to the surface of the second gas diffusing layer, being opposite to the proton exchange membrane, or adhere to the surface of the proton exchange membrane, being opposite the second gas diffusing layer.

When constituting a cell stack, the unit structure, composed of the first gas separator plate, the first gas diffusion layer and the first catalyst on one side, the proton exchange membrane, the second catalyst, the second gas diffusion layer and the second gas separator on the other side, repeats at least twice in a longitudinal, i.e. axial, direction to form the cell stack. The unit structures may be piled one on another or separated by conductive material, and they are bonded under a compressing force in longitudinal direction.

In the step structure of the fuel cell suitable for sealing as disclosed above, the first gas separator and the first gas diffusion layer on the one side, the proton exchange membrane, and the second gas diffusion layer and the second gas separator on the other side may all have a quadrangular or circular shape.

The second gas separator on the other side may be made of gas-impermeable conductive material, with no channel from one front edge to the opposite front edge.

The second gas separator on the other side may also be made of gas-permeable or gas-impermeable conductive material, with channels from one front edge to the opposite front edge.

The first gas separator and the first gas diffusion layer on the one side, the proton exchange membrane, and the second gas diffusion layer and the second gas separator on the other side, which are formed into a step shape, are reduced stepwise in width. Generally, the lower step is 0.2 mm to 30 mm wider than the upper step, i.e. the width of the step face of each step is between 0.2 mm and 30 mm.

The gas separator on the one side and the other side may be a soft graphite plate, a hard graphite plate, a modified metal plate, a plastic conductive plate or a conductive carbon fiber plate.

When assembling, the second gas separator on the other side may have no fixed connection with the other parts of the fuel cell, but rather be bonded merely by a compressing force.

Alternatively, the second gas separator on the other side may be connected with the other parts of the fuel cell through the curing of the fluid sealing material which is filled into the sealing area having the reverse step shape.

The fuel cell may further comprise a supplemental gas diffusion layer on the other side between the second gas diffusion layer on the other side and the second gas separator on the other side. This supplemental gas diffusion layer has an area substantially the same as that of the second gas separator on the other side and is connected with the other parts of the fuel cell through the curing of the fluid sealing material which is filled in the sealing area having the reverse step shape.

The material filled into the sealing area having the reverse step shape may be fluid to be cured or may be a preformed sealing gasket.

A method suitable for manufacturing the sealing structure of the foregoing fuel cell which has a gas separator on one side, a gas separator on the other side, several gas diffusion layers, a proton exchange membrane with catalyst coated thereon and circular sealing gaskets, comprises:

a. preparing a gas separator and a gas diffusion layer on one side, a proton exchange membranes, and a gas diffusion layer on the other side, and disposing at least a pair of through-holes as hydrogen channels in each layer, wherein the gas diffusion layer on the one side and the proton exchange membrane have the same area shape which is smaller than that of the first gas separator on the one side, but larger than that of the second gas diffusion layer on the other side;

b. piling the proton exchange membrane and gas diffusion layers having the different areas described above in size-decreasing order on top of the first gas separator on the one side to form a stack structure in a step shape;

c. infusing sealing material into the resulting sealing area formed with a reverse step shape;

d. placing a non-adhesive flat plate or sheet having an area not smaller than that of the second gas separator on the second gas diffusion layer on the other side at a suitable location such that its extension can cover the area of the second gas separator plate, and applying a compressing force in a longitudinal direction to bond both the upper ends and the lower ends thereof, which are dispensed and spread with adhesive respectively, with the surfaces of their adjacent plate and diffusion layer;

e. curing the plates and layers bonded together for 10 to 24 hours, and then removing the non-adhesive flat plate or sheet;

f. placing a second gas separator on the other side on the bonded second gas diffusion layer of the other side, and applying a compressing force in longitudinal direction to form a single cell; alternatively, stacking several units described above in longitudinal direction and applying a compressing force in longitudinal direction to form a fuel cell stack.

Another method suitable for manufacturing the sealing structure of the foregoing fuel cell which comprises a gas separator on one side, a gas separator on the other side, several gas diffusion layers, a proton exchange membrane with catalyst coated thereon and circular sealing gaskets, comprising:

a. preparing a first gas separator and a first gas diffusion layer on the one side, a proton exchange membrane, and second gas diffusion layer and a supplemental gas diffusion layer on the other side, and disposing at least a pair of through-holes as hydrogen channels in each layer, wherein the first gas diffusion layer on the one side and the proton exchange membrane have the same area which is smaller than that of the first gas separator on the one side, but larger than that of the second gas diffusion layer on the other side, and the supplemental gas diffusion layer on the other side has the same area shape as that of the first gas separator on the one side;

b. piling the proton exchange membrane and gas diffusion layers having the different areas described above in size-decreasing order on top of the first gas separator on the one side to form a stack structure in a step shape;

c. infusing sealing material into the resulting sealing area formed with a reverse step shape;

d. placing a supplemental gas diffusion layer on the other side having the same area as that of the first gas separator on the one side on the second gas diffusion layer on the other side at a suitable location such that its extension can cover the area of the second gas separator plate, and applying a compressing force in a longitudinal direction to bond both the upper ends and the lower ends thereof, which are dispensed and spread with adhesive respectively, with the surfaces of their adjacent plate and diffusion layer;

e. curing the plates and layers bonded together for 10 to 24 hours;

f. placing a gas separator on the other side on the bonded supplemental gas diffusion layer, and applying a compressing force in a longitudinal direction to form a single cell; alternatively, stacking several units described above in a longitudinal direction and applying a compressing force in longitudinal direction to form a fuel cell stack.

The electrolyte membrane according to the invention is not ready to be burnt through and leak gas, and the waste of the electrolyte membrane when enhancing the reliability of sealing is reduced when compared with that of the prior art.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Example 1

Figure 1:
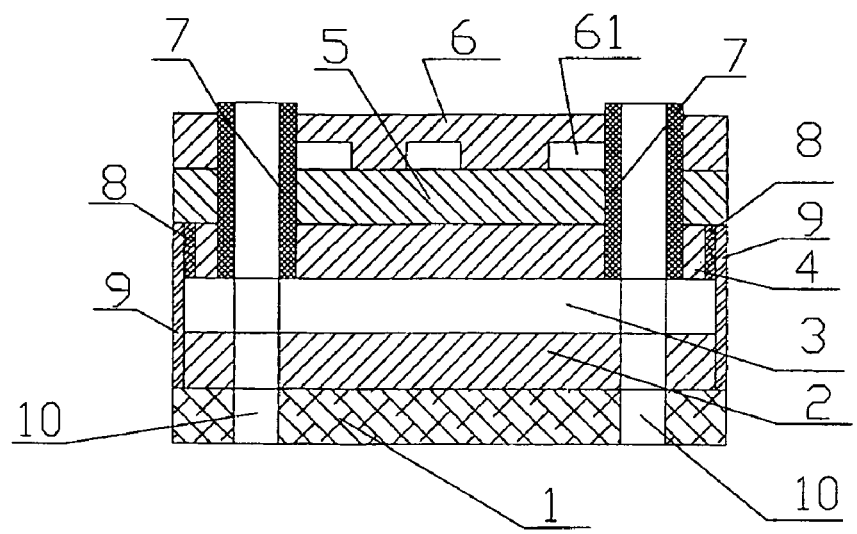
FIG. 1 is a schematic view showing the sealing structure of a fuel cell according to the invention made by a method according to the invention.

With reference to FIG. 1, the sealing structure of a fuel cell according to a first example of the invention is shown. It comprises a first gas separator 1, a first gas diffusion layer 2 disposed on one side of a proton exchange membrane 3 which gas diffusion layer 2 is used as the hydrogen side gas diffusion layer, the membrane 3 with both sides thereof coated with catalyst, a second gas diffusion layer 4 on the other side used as the oxygen side gas diffusion layer, a supplemental gas diffusion layer 5 on the other side, a second gas separator 6 on the other side and sealing gaskets 7.

The above plates and layers are all formed into a rectangular shape, and two through-holes 10 are disposed therein as gas holes. The gaskets 7 are placed around the through-holes 10, surrounded by the oxygen side gas diffusion layer 4, the supplemental gas diffusion layer 5 on the other side and the second gas separator 6 on the other side, with their lower front edges pressing on the proton exchange membrane 3.

In this case, the hydrogen side gas diffusion layer 2 and the proton exchange membrane 3 have the same area and shape which is smaller than that of the first gas separator 1, thus leading to the formation of a step face around the upper surface of the first gas separator 1; while the oxygen side gas diffusion layer 4 has an area and shape smaller than that of the hydrogen side gas diffusion layer 2 or the proton exchange membrane 3, leading to the formation of a step face around the upper surface of the proton exchange membrane 3. In two sub-examples of this example, the widths of these step faces are 0.5 mm and 20 mm respectively.

The supplemental gas diffusion layer 5 and the gas separator 6 on the other side have the same area as that of the first gas separator 1. The supplemental gas diffusion layer 5 on the other side is bonded by sealing material 8 and 9 filled into the volume or area having a reverse step shape.

Second gas separator 6 is made of gas-permeable conductive material, and is designed to have several long parallel stripe-shaped open channels 61. In the two sub-examples of this example, the second gas separator is a hard graphite plate and a carbon fiber plate, respectively.

A fuel cell stack can be formed by repeating the above structures for 20 times and adding accessories such as end plates and fasteners to both sides.

The method for manufacturing the structure comprises:
a. preparing a first gas separator and a first gas diffusion layer on the one side, a proton exchange membrane, a second gas diffusion layer and a supplemental gas diffusion layer on the other side, and disposing at least a pair of through-holes as hydrogen channels in each layer, wherein the first gas diffusion layer on the one side and the proton exchange membrane have the same area which is smaller than that of the first gas separator on the one side, but larger than that of the second gas diffusion layer on the other side, and the supplemental gas diffusion layer on the other side has the same area as that of the first gas separator on the one side;
b. piling the proton exchange membrane and gas diffusion layers having the different areas described above in size-decreasing order on top of the first gas separator on the one side to form a stack structure in a step shape;
c. infusing sealing material into the resulting sealing area formed with a reverse step shape;
d. placing a supplemental gas diffusion layer on the other side having the same area as that of the first gas separator on the one side, on the second gas diffusion layer on the other side at a suitable location such that its extension can cover the area of the second gas separator plate, and applying a compressing force in a longitudinal direction to bond both the upper ends and the lower ends thereof, which are dispensed and spread with adhesive respectively, with the surfaces of their adjacent plate and diffusion layer;
e. curing the plates and layers thus bonded together for 10 to 24 hours;
f. placing a second gas separator on the other side on the bonded supplemental gas diffusion layer on the other side, and applying a compressing force in a longitudinal direction to form a single cell; alternatively, stacking several units described above in a longitudinal direction and applying a compressing force in a longitudinal direction to form a fuel cell stack.

Example 2

Figure 2:
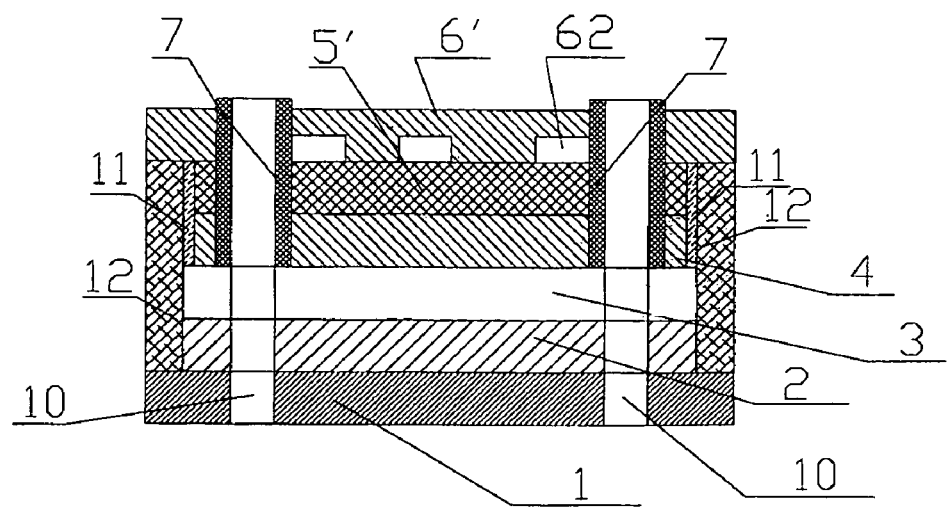
FIG. 2 is a schematic view showing the sealing structure of a fuel cell according to the invention made by another method according to the invention.

With reference to FIG. 2, the sealing structure of a fuel cell according to a second example of the invention is shown. It again comprises a first gas separator 1, a first gas diffusion layer on one side as the hydrogen side gas diffusion layer 2, a proton exchange membrane 3 with both sides coated with catalyst, a second gas diffusion layer on the other side as the oxygen side gas diffusion layer 4, a supplemental gas diffusion layer 5' on the other side, a second gas separator 6' on the other side, and sealing gaskets 7.

The plates and layers described above are all formed into a rectangular shape, and two through-holes 10 are disposed therein as gas holes.

In this case, the hydrogen side gas diffusion layer 2 and the proton exchange membrane 3 have the same area which is smaller than that of the first gas separator 1, thus leading to the formation of a step face around the upper surface of the gas separator 1; while the gas diffusion layer 4 and the supplemental gas diffusion layer 5' on the other side have the same area which is smaller than that of the hydrogen side gas diffusion layer 2 or the proton exchange membrane 3, leading to the formation of a step face around the upper surface of the proton exchange membrane 3. The gas separator 6' on the other side is of the same area as the gas separator 1. The gas separator 6' on the other side is bonded with sealing material 11 and 12 filled in the area having a reverse step shape. In two sub-examples of this example, the widths of these step faces are 0.5 mm and 20 mm respectively.

The second gas separator 6' on the other side is made of gas-impermeable conductive material, and designed to have some long stripe-shaped channels 62 facing the supplemental gas diffusion layer 5' on the other side.

It should be particularly noted that FIG. 2 only shows the cross sections of the sealing gaskets and the through-holes, wherein the channels 62 do not extend to the front edges of the second gas separator 6, i.e. the edges of the second gas separator 6 do not have any channels leading to the outside surrounding area. The channels 62 are used for the air-intake part of the reaction, a passage leading from there to outside the structure is formed by another sealing gasket and a longitudinal through-hole in another cross section of the fuel cell. Such a structure is known as close-cathode fuel cell, i.e. so called dual path air fuel cell. Since this is well known in the prior art, it will not be described in more detail.

Example 3

Figure 3:
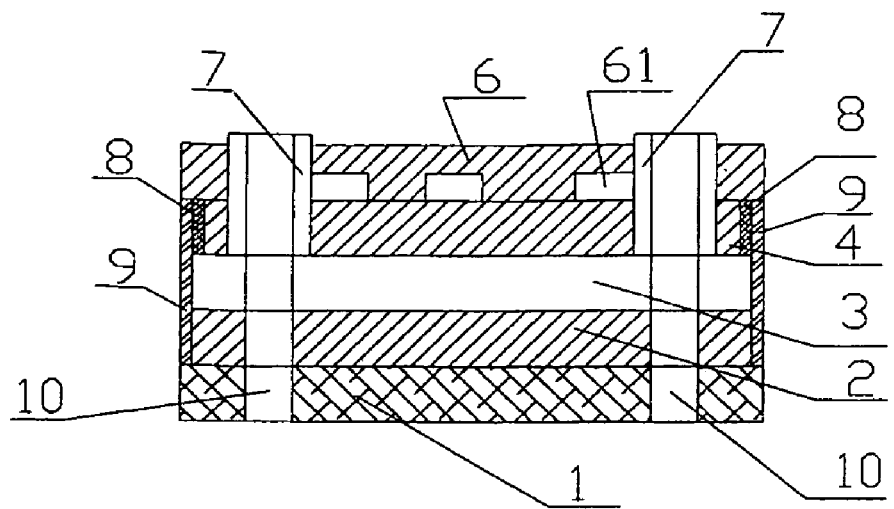
FIG. 3 is a schematic view showing the sealing structure of a fuel cell according to the invention made by another method according to the invention.
Figure 4:
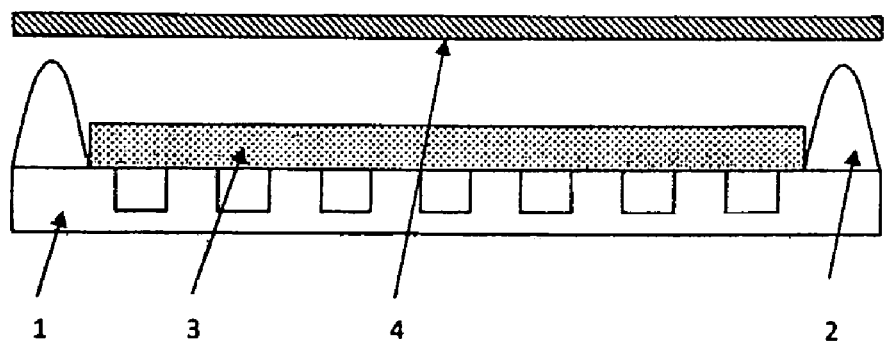
FIG. 4 is a schematic view showing the sealing structure of a fuel cell according to the prior art (U.S. Pat. No. 6,783,883).

With reference to FIG. 3, the sealing structure of a fuel cell according to a third example of the invention is shown. It comprises a first gas separator 1, a first gas diffusion layer on one side as the hydrogen side gas diffusion layer 2, a proton exchange membrane 3 with both sides coated with catalyst, a second gas diffusion layer on the other side as the oxygen side gas diffusion layer 4, a second gas separator 6 on the other side, and sealing gaskets 7.

The plates and layers described above are all formed into a rectangular shape, and two through-holes 10 are disposed therein as gas holes.

In this case, the hydrogen side first gas diffusion layer 2 and the proton exchange membrane 3 have the same area which is smaller than that of the first gas separator 1, leading to the formation of a step face around the upper surface of the first gas separator 1; the oxygen side second gas diffusion layer 4 has an area smaller than that of the hydrogen side first gas diffusion layer 2 or the proton exchange membrane 3, leading to the formation of a step face around the upper surface of the proton exchange membrane 3; and the second gas separator 6 on the other side has the same area as that of the first gas separator 1. Additionally, the second gas separator 6 is designed to have several parallel long stripe-shaped open channels 61. In two sub-examples of this example, the widths of these step faces are 0.5 mm and 20 mm respectively.

The plates and layers described above are piled together in a sequence of from lower to upper as shown in FIG. 3, i.e. the hydrogen side first gas diffusion layer 2, the proton exchange membrane 3, the oxygen side second gas diffusion layer 4 and the second gas separator 6 are disposed in sequence on the first gas separator 1 in stack mode, wherein the areas of the first gas separator 1, the hydrogen side first gas diffusion layer 2, the proton exchange membrane 3 and the oxygen side second gas diffusion layer 4 decrease stepwise, leading to the formation of a step shape structure between their peripheries. An adhesive line layer 8 is coated on the periphery of the oxygen side second gas diffusion layer 4, and adhesive spreading layers 9 are coated on the hydrogen side first gas diffusion layer 2, the proton exchange membrane 3 and the adhesive line layer 8 already coated on the oxygen side second gas diffusion layer 4. The adhesive line layer 8 and the adhesive spreading layers 9 may make up for the step shape between the peripheries, resulting in the alignment between the peripheral surfaces of the spreading layers and the peripheral surfaces of the remaining plates and layers.

The sealing gaskets 7 are disposed hermetically within part of the through-holes 10 of the oxygen side second gas diffusion layer 4 and the second gas separator 6 and are used for achieving a single fuel cell.

The second gas separator 6 does not have a fixed connection with the other parts of the fuel cell, but rather is bonded merely under a compressing force during assembling.

The method for manufacturing the structure comprises:
a. preparing a first gas separator and a first gas diffusion layer on one side, a proton exchange membrane, and a second gas diffusion layer on the other side, and disposing at least a pair of through-holes as hydrogen channels in each of the layers and plates, wherein the first gas diffusion layer on the one side and the proton exchange membrane have the same area which is smaller than that of the first gas separator on the one side, but larger than that of the second gas diffusion layer on the other side;
b. piling the proton exchange membrane and gas diffusion layers having the different areas described above in size-decreasing order on top of the first gas separator on the one side to form a stack structure in a step shape;
c. infusing sealing material into the resulting sealing area formed with a reverse step shape;
d. placing a non-adhesive flat plate or sheet having an area not smaller than that of the second gas separator on the second gas diffusion layer on the other side at a suitable location so that its extension can cover the area of the second gas separator plate, and applying a compressing force in a longitudinal direction to bond both the upper ends and the lower ends thereof, which are dispensed and spread with adhesive respectively, with the surfaces of the adjacent plate and diffusion layer;
e. curing the plates and layers bonded together for 10 to 24 hours, and then removing the non-adhesive flat plate or sheet;
f. placing the second gas separator on the bonded gas diffusion layer on the other side, and applying a compressing force in a longitudinal direction to form a single cell; alternatively, stacking several units described above in a longitudinal direction and applying a compressing force in a longitudinal direction to form a fuel cell stack.

Example 4

The structure of this example, not shown in the drawings, is substantially the same as that in Example 3, and reference can also be made to FIG. 3. The only difference is that the material filled into the sealing area having the reverse step shape is a preformed sealing gasket.

Although the invention has disclosed the sealing structures of a fuel cell and the methods for manufacturing the same by means of examples, it is to be understood by those skilled in the art that various changes or modifications can be made to the structures. Thus, the invention is not limited to the examples, and any equivalent technologies and principles are to be construed as falling within the scope defined by the claims of the invention.

The invention claimed is:
1. A method for manufacturing a multi-layered sealing structure for a fuel cell forming a step shape, the structure of the fuel cell having a first gas separator plate (1) and a first diffusion layer (2) disposed on one side of a two-sided proton exchange membrane (3) which has catalyst coated on each side thereof and a second gas separator plate (6), a second gas diffusion layer (4) and circular sealing gaskets (7) disposed on the opposite side of the proton exchange membrane (3), comprising:
preparing the first gas separator plate (1) and the first gas diffusion layer (2) on one side of the proton exchange membrane (3) and the second gas diffusion layer (4) on the other side of the proton exchange membrane (3), and disposing at least a pair of through-holes (10) as hydrogen channels through each plate and layer, wherein the first gas diffusion layer (2) and the proton exchange membrane (3) have the same area and shape which is smaller than that of the first gas separator plate (1), but larger than that of the second gas diffusion layer (4);
piling the proton exchange membrane (3) and the gas diffusion layers (2, 4) with the different areas described above in size-decreasing order on top of the first gas separator plate (1) to form a step-shaped stack structure;
infusing sealing material (8, 9) into the resulting sealing area formed with a reverse step shape;

placing a non-adhesive flat plate or sheet having an area and shape not smaller than that of the first gas separator plate (1) on the second gas diffusion layer (4), so that it covers the area of the first gas separator plate (1), and applying compressing force in a longitudinal direction to bond both the upper ends and the lower ends thereof, which have been dispensed and spread with adhesive respectively, with the surfaces of the adjacent plates and diffusion layers;

curing the plates and layers bonded together for 10-24 hours;

removing the non-adhesive flat plate or sheet; and placing a second gas separator plate (6) on top of the bonded second gas diffusion layer (4), and applying a compressing force in a longitudinal direction to form a single cell.

2. A method for manufacturing a multi-layered sealing structure for a fuel cell forming a step shape, the structure of the fuel cell having a first gas separator plate (1) and a first diffusion layer (2) disposed on one side of a two-sided proton exchange membrane (3) which has catalyst coated on each side thereof and a second gas separator plate (6), a second gas diffusion layer (4), a supplemental gas diffusion layer (5) and at least one circular sealing gasket (7) disposed on the opposite side of the proton exchange membrane (3), comprising:

preparing the first gas separator plate (1) and the first gas diffusion layer (2) on one side of the proton exchange membrane (3) and the second gas diffusion layer (4) and the supplemental gas diffusion layer (5) on the other side of the proton exchange membrane (3), and disposing at least a pair of through-holes (10) as hydrogen channels through each plate and layer, wherein the first gas diffusion layer (2) and the proton exchange membrane (3) have the same area which is smaller than that of the first gas separator plate (1), but larger than that of the second gas diffusion layer (4) and the supplemental gas diffusion layer has the same area and shape as the first gas separator plate (1);

piling the proton exchange membrane (3) and gas diffusion layers (2, 4) with different areas described above in size-decreasing order on top of the first gas separator plate (1) to form a step-shaped stack;

infusing sealing material (8, 9) into the resulting sealing area formed with a reverse step shape;

placing the supplemental gas diffusion layer (5) on top of the second gas diffusion layer (4) so that it covers the area of the first gas separator plate (1), and applying a compressing force in longitudinal direction to bond both the upper ends and the lower ends thereof, which have been dispensed and spread with adhesive respectively, with the surfaces of the adjacent plates and diffusion layers;

curing the plates and layers bonded together for 10-24 hours; and placing the second gas separator plate (6) on top of the bonded supplemental gas diffusion layer (5), and applying a compressing force in a longitudinal direction to form a single cell.

3. A sealing structure for a fuel cell forming a plurality of layers, each layer having a known identical shape, a known area and a known perimeter, arranged one on top of the other comprising:

a two-sided first gas separator layer (1) having an inner side and an outer side;

a two-sided first gas diffusion layer (2), each side thereof having an area which is less than the area of either side of said first gas separator layer (1), a first side of said first gas diffusion layer (2) being aligned so as to be centered over, brought into contact with and completely cover a first part of the inner side of said first gas separator layer (1), leaving a continuous second part of the inner side of said first gas separator layer (1) around the perimeter of said first gas separator layer (1) uncovered such that the perimeter of said first gas diffusion layer (2) is equidistant from the perimeter of said first gas separator layer (1);

a two-sided proton exchange membrane layer (3), each side thereof being coated with a catalyst and having an area equal to the area of the second side of said first gas diffusion layer (2), the first side of said membrane layer (3) being aligned so as to be centered over and completely cover the second side of said first gas diffusion layer (2) and being brought into contact therewith;

a two-sided second gas diffusion layer (4), each side thereof having an area which is less than the area of either side of said proton exchange membrane layer (3), a first side of said second gas diffusion layer (4) being aligned so as to be centered over, brought into contact with and completely cover a first part of the second side of said proton exchange membrane layer (3), leaving a continuous second part of the second side of said proton exchange membrane layer (3) around the periphery of said membrane layer (3) uncovered such that the perimeter of said second gas diffusion layer (4) is equidistant from the perimeter of said proton exchange membrane layer (3);

a two-sided second gas separator layer (6) having an inner side, an outer side, and an area on both sides equal to the area of the inner side of said first gas separator layer (1), the perimeter of said second gas separator layer (6) being aligned directly over the perimeter of the inner side of said first gas separator layer (1) and the inner side of said gas separator layer (6) being placed on top of, directly in contact with and completely covering the second side of said second gas diffusion layer (4);

first sealing means (8) for covering the second part of the second side of said proton exchange membrane layer (3) and extending in width from the perimeter of said second gas diffusion layer (4) to the perimeter of said proton exchange membrane layer (3) and in height from the second side of said proton exchange membrane layer (3) to the inner side of said second gas separator layer (6); and second sealing means (9) for covering the second part of the inner side of said first gas separator layer (1), said second sealing means (9) extending in width from the perimeters of said first gas diffusion layer (2) and said proton exchange membrane layer (3) to the perimeter of said first gas separator layer (1) and in height from the inner side of said first gas separator layer (1) to the inner side of said second gas separator layer (6).

4. The sealing structure of claim 3 further comprising:

at least one hollow, ring-shaped sealing gasket (7) having a known inner diameter and a known outer diameter; and at least one through-hole (10) extending continuously through each layer from the outer side of said first gas separator layer (1) to the outer side of said second gas separator layer (6), each said through-hole (10) having a diameter equal to the known outer diameter of said at least one ring-shaped sealing gasket (7) for that portion of the hole running from the outer side of said second gas separator layer (6) through to the first side of said second gas diffusion layer (4) and a diameter equal to the known inner diameter of said at least one ring-shaped sealing gasket (7) for that portion of the hole running from the second side of said proton exchange membrane layer (3) through to the outer side of said first gas separator layer (1), wherein the centers of the at least one through-hole (10) are aligned with each other throughout each layer, and wherein further said at least one sealing gasket (7) is disposed hermetically in said at least one through-hole (10) and extends from the outer side of said second gas separator layer (6) through to the second side of said proton exchange membrane layer (3) but does not enter the at least one through-hole (10) in said proton exchange membrane layer (3).

5. The sealing structure of claim 3, wherein said second gas separator layer (6) is made of gas-permeable conductive material and optionally includes at least two parallel stripe-shaped open-air channels (61) running entirely across the inner side of said second gas separator layer.

6. The sealing structure of claim 3, wherein said second gas separator layer (6) is made of gas-impermeable conductive material.

7. The sealing structure of claim 3, wherein said first gas separator layer (1) is between 0.2 mm and 30 mm wider than said first gas diffusion layer (2) which is further between 0.2 mm and 30 mm wider than said second gas diffusion layer (4).

8. The sealing structure of claim 3, wherein said first gas separator layer (1) and said second gas separator layer (6) are each made from one of the materials selected from the group consisting of soft graphite, hard graphite, modified metal, plastic conductive or conductive carbon fiber.

9. The sealing structure of claim 3, wherein said second gas separator layer (6) is affixed to said second gas diffusion layer (4) solely by bonding resulting from application of a longitudinal compression force to the outer side of said second gas separator layer (6).

10. The sealing structure of claim 3, wherein the inner side of said second gas separator layer (6) is bonded to all of the other layers of the sealing structure as the result of curing of said first sealing means (8) and said second sealing means (9).

11. The sealing structure of claim 3, wherein said first sealing means (8) and said second sealing means (9) are each a preformed sealing gasket.

12. The sealing structure of claim 3, further comprising a two-sided supplemental gas diffusion layer (5) having an area and shape equal to the area and shape of the inner side of said second gas separator layer (6), said supplemental gas diffusion layer (5) being positioned between said second gas separator layer (6) and said second gas diffusion layer (4), the perimeter of said gas diffusion layer (5) being aligned with the perimeter of said first gas separator layer (1) and the first side of said supplemental gas diffusion layer (5) being placed on top of, against and extending beyond the perimeter of the second side of said second gas diffusion layer (4), wherein the second side of said gas diffusion layer (5) is placed in direct contact with the inner side of said second gas separator layer (6) and wherein further the height of said first sealing means (8) extends from the second part of the second side of said proton exchange membrane layer (3) to the second side of said supplemental gas diffusion layer (5) and the height of said second sealing means (9) extends from the second part of the inner side of said first gas separator layer (1) to the second side of said supplemental gas diffusion layer (5).

13. The sealing structure of claim 3, further comprising a two-sided supplemental gas diffusion layer (5') having an area and shape equal to the area and shape of the second side of said second gas diffusion layer (4), said supplemental gas diffusion layer (5') being positioned between said second gas separator layer (6') and said second gas diffusion layer (4), the perimeter of said gas diffusion layer (5') being aligned with the perimeter of said second gas diffusion layer (4) and the first side of said supplemental gas diffusion layer (5') being placed on top of, against and completely covering the second side of said second gas diffusion layer (4), wherein the second side of said gas diffusion layer (5') is placed in direct contact with the inner side of said second gas separator layer (6') and wherein further the height of said first sealing means (11) extends from the second part of the second side of said proton exchange membrane layer (3) to the inner side of said second gas separator layer (6') and the height of said second sealing means (12) extends from the second part of the inner side of said first gas separator layer (1) to the inner side of said second gas separator layer (6').

14. The sealing structure of claim 3 wherein each of said gas separator layer (1), said first gas diffusion layer (2), said proton exchange membrane layer (3), said second gas diffusion layer and said gas separator layer (6) is either quadrangular or circular in shape.

15. The sealing structure of claim 3, wherein the second side of said first gas diffusion layer (2) and the first side of said second gas diffusion layer (4) are each coated with a catalyst while neither side of said proton exchange membrane layer (3) is coated with a catalyst.

16. The sealing structure of claim 3, wherein said proton exchange membrane layer (3) has an area and dimensions less than the area and dimensions of the second side of said first gas diffusion layer (2) and said first sealing means (8) extends in width from the perimeters of said second gas diffusion layer (4) and said proton exchange membrane layer (3) to the perimeter of said first gas diffusion layer (2) and in height from the second side of said first gas diffusion layer (2) to the inner side of said second gas separator layer (6).

\* \* \* \* \*